(12) United States Patent
Zareba et al.

(10) Patent No.: US 12,258,938 B2
(45) Date of Patent: Mar. 25, 2025

(54) TRANSPORTING A WIND TURBINE COMPONENT

(71) Applicant: Siemens Gamesa Renewable Energy A/S, Brande (DK)

(72) Inventors: Witold Zareba, Vejle (DK); Jesper Dommerby Ringgaard, Herning (DK)

(73) Assignee: Siemens Gamesa Renewable Energy A/S, Brande (DK)

( * ) Notice: Subject to any disclaimer, the term of this patent is extended or adjusted under 35 U.S.C. 154(b) by 0 days.

(21) Appl. No.: 17/270,773

(22) PCT Filed: Jul. 24, 2019

(86) PCT No.: PCT/EP2019/069972
§ 371 (c)(1),
(2) Date: Feb. 23, 2021

(87) PCT Pub. No.: WO2020/043399
PCT Pub. Date: Mar. 5, 2020

(65) Prior Publication Data
US 2021/0340960 A1    Nov. 4, 2021

(30) Foreign Application Priority Data
Aug. 29, 2018   (EP) .................................... 18191403

(51) Int. Cl.
*F03D 13/40* (2016.01)
*B60P 3/40* (2006.01)

(52) U.S. Cl.
CPC ................ *F03D 13/40* (2016.05); *B60P 3/40* (2013.01); *F05B 2260/02* (2013.01)

(58) Field of Classification Search
CPC .......... F03D 13/00; F03D 13/40; F03D 13/20; B60P 3/40; B60P 3/1033; B60P 7/06; F05B 2260/02
See application file for complete search history.

(56) References Cited

U.S. PATENT DOCUMENTS

| | | |
|---|---|---|
| 2011/0260428 A1 | 10/2011 | Pedersen |
| 2011/0304122 A1 | 12/2011 | Poulsen |

(Continued)

FOREIGN PATENT DOCUMENTS

| | | |
|---|---|---|
| CN | 102085938 A | 6/2011 |
| CN | 102628429 A | 8/2012 |

(Continued)

OTHER PUBLICATIONS

European Search Report issued on Mar. 11, 2019 for application No. 18191403.7.

(Continued)

*Primary Examiner* — Christopher J. Besler
(74) *Attorney, Agent, or Firm* — Schmeiser, Olsen & Watts, LLP (57) ABSTRACT

Provided is an arrangement for transporting a wind turbine component, the arrangement including: a first portion adapted to be placed on a loading area, in particular of a trailer; a second portion, in particular component adapter portion, adapted to support the component; the first portion and the second portion each having a respective connection interface via which the first portion and the second portion are reversibly couplable to each other.

19 Claims, 6 Drawing Sheets

(56) References Cited

U.S. PATENT DOCUMENTS

2012/0171007 A1 7/2012 Poulsen
2017/0253169 A1 9/2017 Keller et al.

FOREIGN PATENT DOCUMENTS

| CN | 103452752 | A | 12/2013 | | |
|----|-----------|---|---------|---|---|
| CN | 105089948 | A | 11/2015 | | |
| CN | 107444746 | A | 12/2017 | | |
| CN | 207241559 | U | 4/2018 | | |
| EP | 2383210 | A1 | 11/2011 | | |
| EP | 2395240 | A1 | 12/2011 | | |
| WO | 2010066255 | A1 | 6/2010 | | |
| WO | 2010069611 | A1 | 6/2010 | | |
| WO | 2013086770 | A1 | 6/2013 | | |
| WO | WO-2015024590 | A1 * | 2/2015 | ............. | B65D 85/64 |
| WO | WO-2018046436 | A1 * | 3/2018 | ............. | F03D 13/40 |
| WO | 2018086837 | A1 | 5/2018 | | |

OTHER PUBLICATIONS

International Search Report issued on Nov. 13, 2019 for application No. PCT/EP2019/069972.

* cited by examiner

TRANSPORTING A WIND TURBINE COMPONENT

CROSS-REFERENCE TO RELATED APPLICATIONS

This application claims priority to PCT Application No. PCT/EP2019/069972, having a filing date of Jul. 24, 2019, which is based off of EP Application No. 18191403.7, having a filing date of Aug. 29, 2018, the entire contents both of which are hereby incorporated by reference.

FIELD OF TECHNOLOGY

The following relates to an arrangement for transporting a wind turbine component, and further relates to a method of preparing transporting a wind turbine component.

BACKGROUND

Wind turbines may be installed offshore requiring transportation to the installation site. Transportation of offshore components of a wind turbine has previously been carried out on particular transport frames tailored and designed for a specific turbine component and having a particular component-specific configuration that is suited for specific trailer (SPMT). This resulted in the necessity to design and develop multiple different specific transport frames. Reusability potential of these particular transport frames for use for other wind turbine components is very low. With a relatively frequent change to either turbine or trailer design, this has caused several retrofits, sometimes causing the retrofitted frame to be unusable for its originally intended purpose.

Conventionally, changes to turbine components or trailer has resulted in a new calculation and design of the frame and subsequent definition of retrofit/reinforcement of highly utilized areas. The frame is then sent for retrofit conventionally at a supplier or new frames (component/trailer-specific) have been developed according to the related art.

Thus, there may be a need for an arrangement for transporting a wind turbine component and a method of preparing transporting a wind turbine component wherein, the arrangement or equipment can be adapted in a simpler manner to changes in either turbine component construction or design or trailer configuration or design. In particular, a need may exist for a simple arrangement for transporting a wind turbine component which has high flexibility regarding different wind turbine components and different transportation vehicles, in particular so called self-propelled trailers.

SUMMARY

According to an embodiment of the present invention it is provided an arrangement for transporting a wind turbine component, the arrangement comprising: at least one first portion (in particular adapted as tunnel frame) adapted to be placed on a loading area, in particular of a trailer; a second portion, in particular component adapter portion, adapted to support (and/or be mounted to) the component; the first portion and the second portion each having a respective connection interface via which the first portion and the second portion are reversibly couplable to each other.

The first portion as well as the second portion may substantially be manufactured from metal, in particular steel. The first portion may in particular be configured as a tunnel frame which may be loaded onto a trailer or other vehicle. The tunnel frame can be supported in two or more points or contact portions (e.g., cross beams) by the (in particular loading area of the) trailer creating simply supported beam. The loading area may in particular be a substantially flat loading area comprising a substantially flat surface. The loading area may for example have a rectangular shape having a length (or longitudinal) direction and a width direction, the extension in the length direction in particular being between two times and ten times or two times and twenty times as large as an extension along the width direction. Only two or more loading contact portions of the loading may contact the first portion of the arrangement. The loading contact portions may e.g., located under cross-beams, e.g. beam 33 and 35 described below. The loading contact portions may be wider than long.

The second portion may also be referred to as a component adapter portion being specifically constructed and designed based on a design and/or geometry and/or weight of the wind turbine component to be supported by the second portion. Thus, the second portion may comprise structural features which enable to support or in particular also reversibly mount or fix the wind turbine component to the second portion. The mounting may for example comprise bolting and/or clamping or a combination thereof.

The wind turbine component may for example be or comprise a nacelle and/or a wind turbine blade and/or a wind turbine hub and/or at least a portion of a wind turbine tower, a wind turbine generator, a wind turbine converter, a wind turbine transformer or the like. The weight of the wind turbine component may be between 1 ton and 500 tonnes for example (presented configuration).

The connection interface of the first portion and/or of the second portion may comprise several sections which are spaced apart from each other so that for example the respective connection interface is not necessarily continuous. Via the respective connection interfaces and in particular via contacting the connection interfaces and fixing them together using a connector or connection means, the first portion may be coupled to the second portion. Beside the connection interface, the first portion and/or the second portion may comprise contact surfaces which may contact the respective other portion when the first portion and the second portion is coupled to each other via the respective connection interface. The connection interface at the first portion and/or the second portion may have a predetermined geometry being independent of the geometry or construction of the wind turbine component to be transported.

To the first portion, either the second portion or another second portion may be coupled, the other second portion being adapted to support another component of the wind turbine. Still further, a still other second portion may be coupled to the first portion, wherein the still other second portion may be adapted to support a still other wind turbine component. Thereby, a modular system is provided enabling to transport a number of differently shaped or differently constructed wind turbine components to each of which only a particular variant of a second portion is associated by which the respective wind turbine component can be supported. However, only a single first portion is necessary at which either variant of the plural second different portions may be coupled. This is enabled by any variant of the second portion comprising a connection interface which is configured to be compatible with (or couplable to) the connection interface of the first portion.

In particular, the connection interface of the first portion may comprise several sections. One or more of the sections of the connection interface of the first portion may be utilized for coupling the respective second portion, in particular the connection interface of the second portion. Another section of the connection interface of the first portion may for example be utilized for coupling the connection interface of another second portion. Depending on the geometry, design and/or construction of the respective variant of the second portion, these sections of the connection interface of the first portion or those sections of the connection interface of the first portion may be utilized for coupling the first portion to the respective variant of the second portion. Thereby, a high flexibility may be provided thereby not requiring to design for each wind turbine component a specific first portion.

Thereby, flexibility is achieved that e.g., a (wind turbine component) specific (unchanged) second portion can be used for transportation on a completely different trailer if another (trailer specific) version of the first portion is designed.

The second portion may be relatively less expensive than the first portion. If for example a design of a wind turbine component changes, it may be necessary to only change or adapt the respective second portion, without requiring to change also the first portion.

When the first portion and the second portion are coupled to each other, they contact at least at the respective connection interfaces, but also via other contact surfaces. In particular, the first portion and the second portion may contact in a single plane.

According to an embodiment of the present invention, the arrangement further comprises a connector or connection means, in particular bolts, adapted to mount the connection interface of the first portion to the connection interface of the second portion.

The connection means or connector may be adapted to reversibly connect the connection interface of the first portion with the respective connection interface of the second portion. The bolts assemblies may comprise screws or bolts or threaded rods and also in particular nuts and washers. Thereby, a simple reversible coupling may be achieved.

According to an embodiment of the present invention, the connection interface of the first portion and/or the second portion comprises at least one, in particular at least four, in particular substantially flat, connection plates each having at least one hole for at least one bolt.

The connection plates may provide flat surfaces via which the first portion and the second portion may contact. Four connection plates may for example ensure a safe and secure connection or coupling. Each connection plate may for example comprise for example six to sixteen holes or in particular ten holes. Thereby, a secure coupling may be achieved by inserting bolts into the holes or screwing screws into an internal screw thread of the connection plate of for example the first portion, after the screw has been inserted into a hole of a connection plate of the second portion.

According to an embodiment of the present invention, contact surfaces of all connection plates of the first portion are arranged in a (single) plane, wherein contact surfaces of all connection plates of the second portion are arranged in a plane.

When all the contact surfaces of all connection plates of the first portion and the second portion are arranged in a respective plane, putting the second component onto the first portion may be simplified. Further, slightly shifting the second portion relative to the first portion for bringing respective holes of the connection plate of the second portion in register with holes of the respective connection plate of the first portion may be enabled.

According to an embodiment of the present invention, at least one hole of a connection plate of the first portion comprises an internal screw thread, wherein at least one hole of a connection plate of the second portion is a through hole.

However, threaded holes will not yield re-usability as threads are often being damaged when used. Thus, in other embodiments the arrangement does not contain any threaded holes. All holes may be through holes for bolt to nut assemblies, also in particular including nuts/washers.

A screw may for example be inserted into the through hole of the connection plate of the second portion and may then be screwed into the internal screw thread of the connection plate of the first portion. Thereby, nuts may not be required according to this embodiment of the present invention. For example, it may only be required to access the second portion for putting the respective screws in the through holes in the connection plates of the second portion.

According to an embodiment of the present invention, the first portion comprises two parallel longitudinal beams and, in particular at least at longitudinal ends, cross beams extending perpendicular to the longitudinal beams and connecting the longitudinal beams, wherein the connection plates of the first portion are arranged on the longitudinal beams.

The respective longitudinal beams may be metal beams having for example a cross-section like an "I" or a "T" or "C" or "H". Also, the cross beams may be metal beams, in particular steel beams also having as a cross-section a shape of an "I" or a "T" or "C" or "H". Thereby, rigidity and strength may be improved. At least lower portions of the cross beams may be placed on a vehicle, like a trailer for transporting the arrangement including the first portion, the second portion and the wind turbine component supported by the second portion. When the connection plates of the first portion are arranged on the longitudinal beams, they may not interfere with putting or loading the first portion onto a trailer or any vehicle. In particular, the connection plates of the first portions may be arranged on an upper side of the longitudinal beams of the first portion.

According to an embodiment of the present invention, the connection plates of the first and the second portion are fixed, in particular by welding, at the first portion and the second portion, respectively, in a predetermined, in particular rectangular, pattern, having predetermined distances from each other in two different lateral (e.g. length and width) directions.

The first portion may comprise for example between four and twenty connection plates, in particular all arranged on the longitudinal beams. For coupling a particular variant of the second portion to the first portion, not all but a subset of these connection plates may be utilized for coupling the first portion and the second portion.

According to an embodiment of the present invention, the pattern of at least a part (e.g., some) of the connection plates of the first portion matches the pattern of the connection plates of the second portion such that the part of the connection plates of the first portion superimposes on the connection plates of the second portion.

In particular, a pattern of at least another part (e.g., some other) of the connection plates of the first portion may match the pattern of connection plates of another (variant) of the second portion. A still other part of the connection plates of the first portion may match the pattern of connection plates of still another variant of the second portion. Thus, the pattern of connection plates on the first portion may enable for coupling different variants of the second portion for supporting different wind turbine components.

According to an embodiment of the present invention, the connection plates of the first portion and/or the second portion are spaced apart in a width direction by a first distance, wherein adjacent of the connection plates of at least the first portion are spaced apart in a longitudinal direction by at least two different second distances.

When the connection plates of the first portion are spaced apart (or have a distance between each other) in a longitudinal direction (in particular along the longitudinal beams) by at least two different second distances, it is enabled to place different variants of the second portion having differently spaced connection plates to the first portion.

Mutual distances between connection plates on the first portion along the longitudinal direction may for example vary between one unit length and three unit lengths, wherein one unit length may for example be between 1 m and 10 m. Other values are possible.

According to an embodiment of the present invention, at least two columns of connection plates are fixed at the first portion, in particular on the longitudinal beams, and/or at the second portion, the two columns being spaced apart in the width direction by the first distance.

Also, on the second portion at least two columns or beams or series (e.g. each forming a straight or curved line) of connection plates are fixed according to an embodiment of the present invention. The first distance may for example substantially correspond or be equal to the length of the cross beams. The first distance may be slightly greater than a width of a trailer on which the first portion may be loaded.

According to an embodiment of the present invention, each column has several rows of connection plates being spaced apart in the longitudinal direction by the second distances. On the first portion there may be for example four to ten rows of connection plates. On the second portion there may be two rows of connection plates or more.

According to an embodiment of the present invention, the first portion further comprises a loading area contact surface, in particular substantially flat, the loading area contact surface in particular being at least partly formed by (in particular lower) surfaces of the cross beams.

Via the loading area contact surface, the first portion may contact a transport vehicle, such as a trailer. The cross beams may be free of any features for coupling the first portion to the second portion. Thus, coupling the first portion to the second portion via the connection plates exclusively arranged at the longitudinal beams may not interfere with loading the first portion to a transport vehicle, in particular a trailer.

If more supporting points are required then, in other embodiments, also one or more support portions of the second portion can also contact the trailer to contribute in load carrying.

According to an embodiment of the present invention, the first portion is configured as a tunnel frame forming a tunnel when placed at a ground, wherein a trailer can be moved into the tunnel and can lift the first portion from the ground for transporting the wind turbine component. Thereby, conventionally available equipment may be supported, thereby extending the flexibility of the method and the usability of the arrangement.

According to an embodiment of the present invention, the arrangement further comprises another second portion adapted to support another wind turbine component; the other second portion each connection interface via which the first portion and the other second portion are reversibly couplable to each other, and/or the arrangement further comprising: a self-propelled modular transport (SPMT) and/or a trailer and/or a truck on which the first portion is placeable.

The arrangement may comprise still further (variants of) second portions each being adapted to support a particular wind turbine component. All these variants of the second portions may comprise a respective connection interface which may match a specific portion of the connection interface of the first portion of the arrangement. Thereby, many different wind turbine components may be transported using only specific second portions but only one single first portion.

It should be understood, that features, individually or in any combination, disclosed, described, explained or provided for an arrangement for transporting a wind turbine component may also be applied, individually or in any combination, to a method of preparing transporting a wind turbine component, according to embodiments of the present invention and vice versa.

According to an embodiment of the present invention it is provided a method of preparing transporting a wind turbine component, the method comprising: supporting the component by a second portion; coupling the second portion to a first portion via respective connection interfaces of the first portion and the second portion; and placing the first portion on a loading area.

Embodiments of the present invention are now described with reference to the accompanying drawings. Embodiments of the invention is not restricted to the illustrated or described embodiments.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

Advantageously, due to multiple connection plates available on the first portion it may be enabled to locate/design second portion so overall center of gravity (CoG) location is optimal for transportation. Due to having more connection points than minimum, the connection points can freely be chosen on first portion when the second portion is developed, so that the CoG is where it is desired to be.

Some second portions can be designed to be mounted in the center of the first portion while others can be mounted in the rear/front end.

BRIEF DESCRIPTION

Some of the embodiments will be described in detail, with reference to the following figures, wherein like designations denote like members, wherein.

DETAILED DESCRIPTION

The illustration in the drawings is in schematic form. It is noted that in different figures, similar or identical elements are provided with the same reference signs or with reference signs, which are different from the corresponding reference signs only within the first digit.

Figure 1:
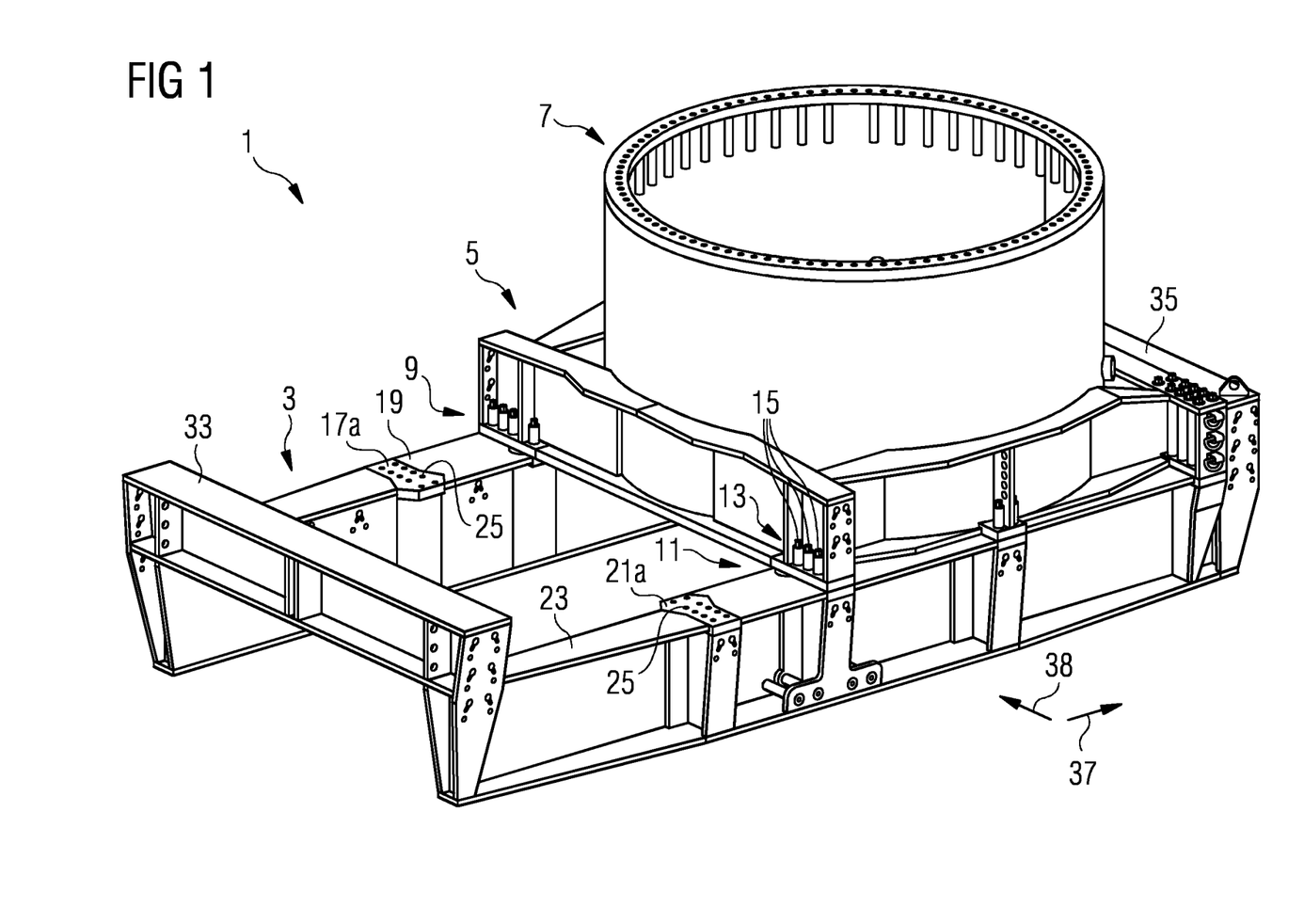
FIG. 1 schematically illustrates a isometric view of an arrangement for transporting a wind turbine component according to an embodiment of the present invention.

The arrangement 1 for transporting a wind turbine component illustrated in a isometric schematic view in FIG. 1 comprises a first portion (configured as funnel frame) 3 which is adapted to be placed on a not illustrated loading area, in particular of a trailer. The arrangement 1 further comprises a second portion 5 (also referred to as component adapter portion) which is adapted to support a not illustrated wind turbine component, in particular via component support portion 7. In the illustrated example, the component support portion 7 has cylindrical shape.

The first portion 3 and the second portion 5 both have a respective connection interface 9 and 11, respectively. The connection interface of the first portion 3 is denoted by reference sign 9 and the connection interface of the second portion 5 is denoted by reference sign 11. Via the connection interfaces 9, 11, the first portion 3 and the second portion 5 is reversibly coupled to each other.

The arrangement further comprises connection means or connector 13, in particular bolts 15, which are adapted to mount the connection interface 9 of the first portion to the connection interface 11 of the second portion 5.

Figure 2:
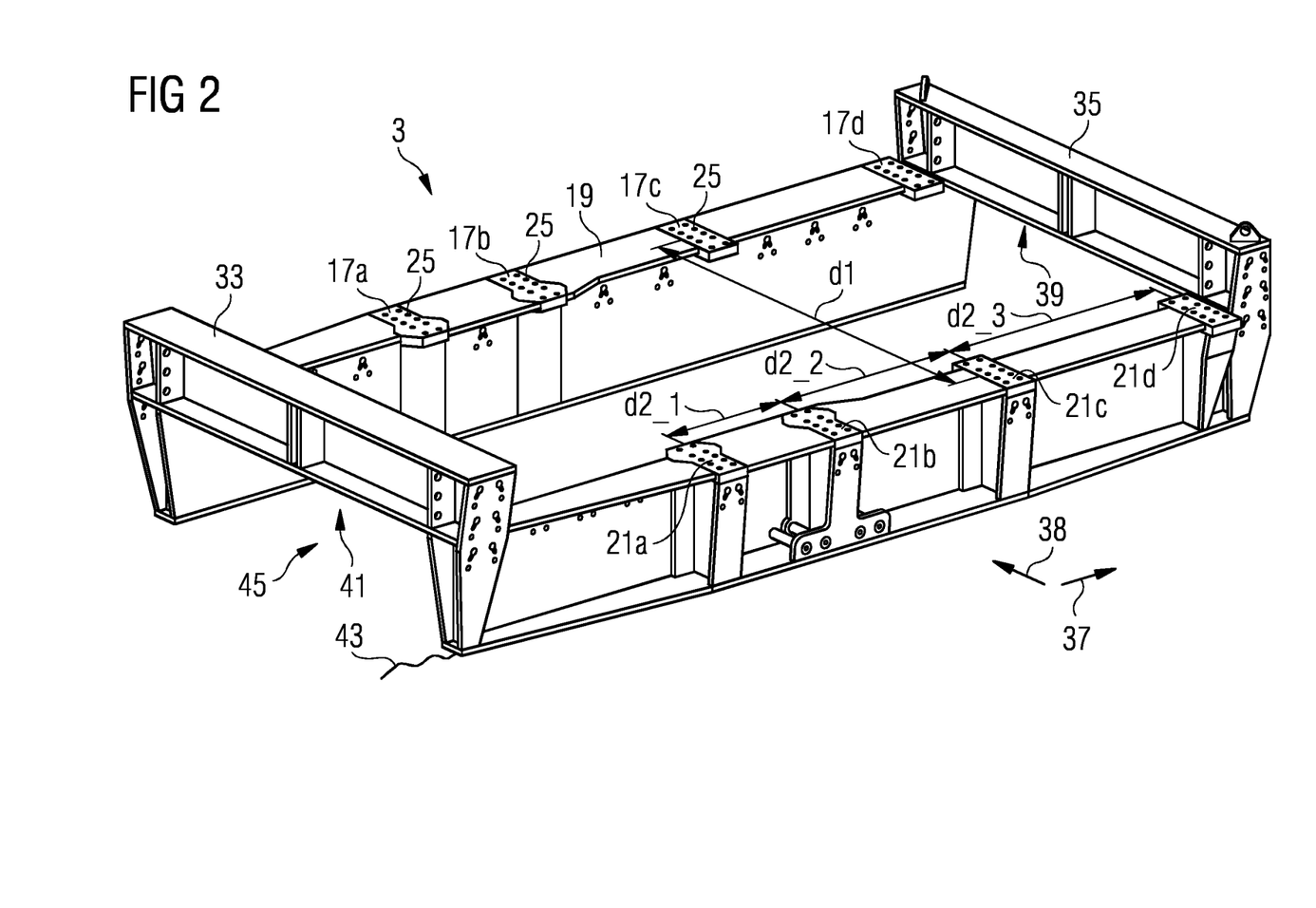
FIG. 2 illustrates a first portion of the arrangement for transporting a wind turbine component illustrated in FIG. 1 in a schematic isometric view.

In particular, the connection interface 9 of the first portion 3 comprises at least one, in particular several, connection plates 17a, 17b, 17c, 17d on a first longitudinal beam 19 and also plural connection plates 21a, 21b, 21c, 21d on a second longitudinal beam 23, as is illustrated in FIG. 2. In FIG. 2, the second portion 5 is omitted, thereby more clearly showing the connection plates 17b, 17d, 17c, 21b, 21c and 21d which are employed for coupling the second portion 5 to the first portion 3 exclusively shown on FIG. 2.

All connection plates 17a, . . . , 17d, 21a, . . . , 21d lie in a single plane. Each of the connection plates 17a, . . . , 17d, 21a, . . . , 21d comprise at least one hole 25, 31 (see FIG. 3), in particular ten (or less or more) holes, for bolts or screws. In particular, at least some of the holes 25 may comprise an internal screw thread for screwing a bolt screw or threaded rod into the thread.

Figure 3:
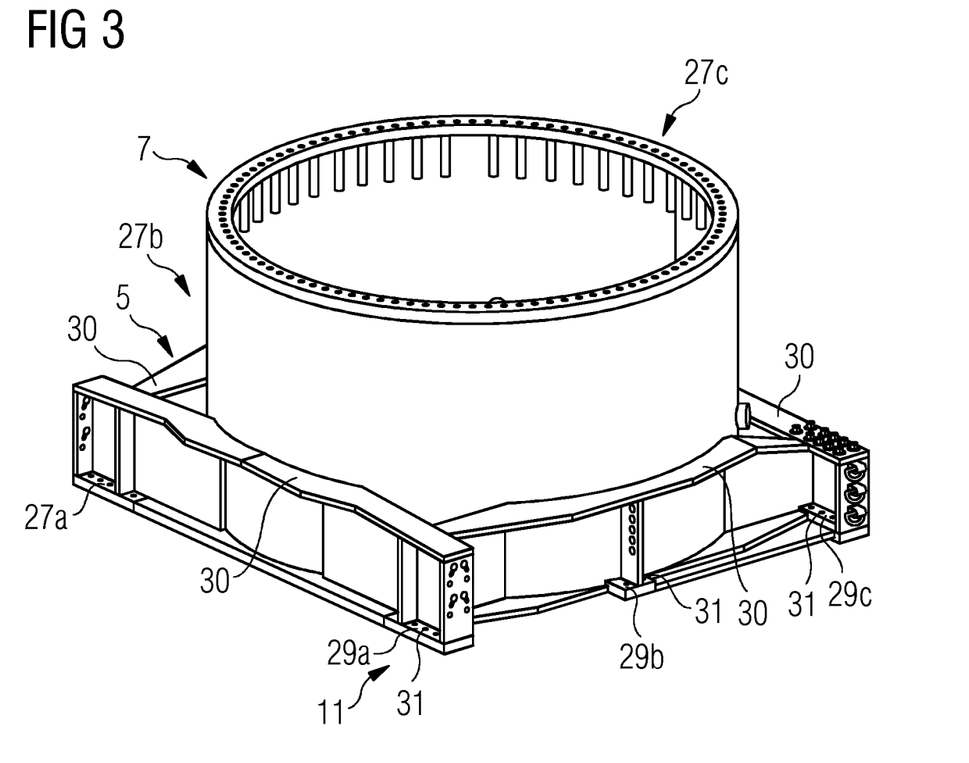
FIG. 3 schematically illustrates in a isometric view a second portion together with a wind turbine component of the arrangement for transporting a wind turbine component illustrated in FIG. 1.

Also, the second portion 5 illustrated in FIG. 3 together with the component support portion 7 but without the first portion 3 comprises as the connection interface 11 several connection plates 27a (and 27b and 27c, not illustrated obscured by the component support portion 7) and further connection plates 29a, 29b, 29c each having at least one through hole 31. The second portion 5 comprises the component support portion 7, and holding and/or fixing beams or structures 30 specifically designed for supporting and/of fixing the second portion and therefore indirectly the component.

As is illustrated in FIG. 1, the screws 15 are inserted through the through holes 31 of the second portion 5 and through the through holes 25 at the respective connection plates of the first portion 3 and fixed using nuts for coupling the first portion 3 to the second portion 5.

In some places the holes are equipped with bolt extenders which could be welded on or just be loose parts. Bolt extender steel tube may reduce eventual loss of pretension.

As is illustrated in FIG. 2, the first portion 3 comprises beside the parallel longitudinal beams 19, 23 (on which the connection plates 17, 21 are arranged) at least two cross beams 33, 35, in particular at longitudinal ends of the longitudinal beams 19, 23 and extending perpendicular to the longitudinal beams 19, 23.

As is apparent from FIG. 2, the connection plates 17a, . . . , 17d, 21a, . . . , 21d are arranged in a particular pattern, in particular two-dimensional rectangular pattern. In particular, the pattern of the connection plates 17b, 17c, 17d, 21b, 21c, 21d matches the pattern of the connection plates 27a, 27b, 27c, 29a, 29b, 29c of the second portion 5 such that for example the holes in the respective connection plates register with respective holes in the connection plates of the respective other portion. In particular, the column of connection plates 17a, 17b, 17c, 17d and the other column 21a, 21b, 21c, 21d are spaced apart (in the width direction 38) by a first distance d1 which is substantially constant with respect to two connection plates (having same suffix reference literal) in the same row. For example, the distance between the connection plate 17a and the connection plate 21a equals the distance between the connection plate 17b and 21b. However, in the longitudinal direction 37, adjacent connection plates (at least of the first portion 3) are spaced apart in at least two different second distances d2_1, d2_2 or d2_3. Thereby, different variants of the second portion 5 may be coupled to the first portion 3.

A lower surface of the cross beams 33, 35 forms a loading area contact surface 39, 41 which may be placed onto a loading surface, for example of a trailer. As can also be appreciated from FIG. 2, the first portion 3 is configured as a tunnel frame forming a tunnel when placed at a ground 43, wherein a not illustrated trailer can be moved into the tunnel 45 and can lift the first portion 3 from the ground 43 for transporting the wind turbine component.

Figure 4:
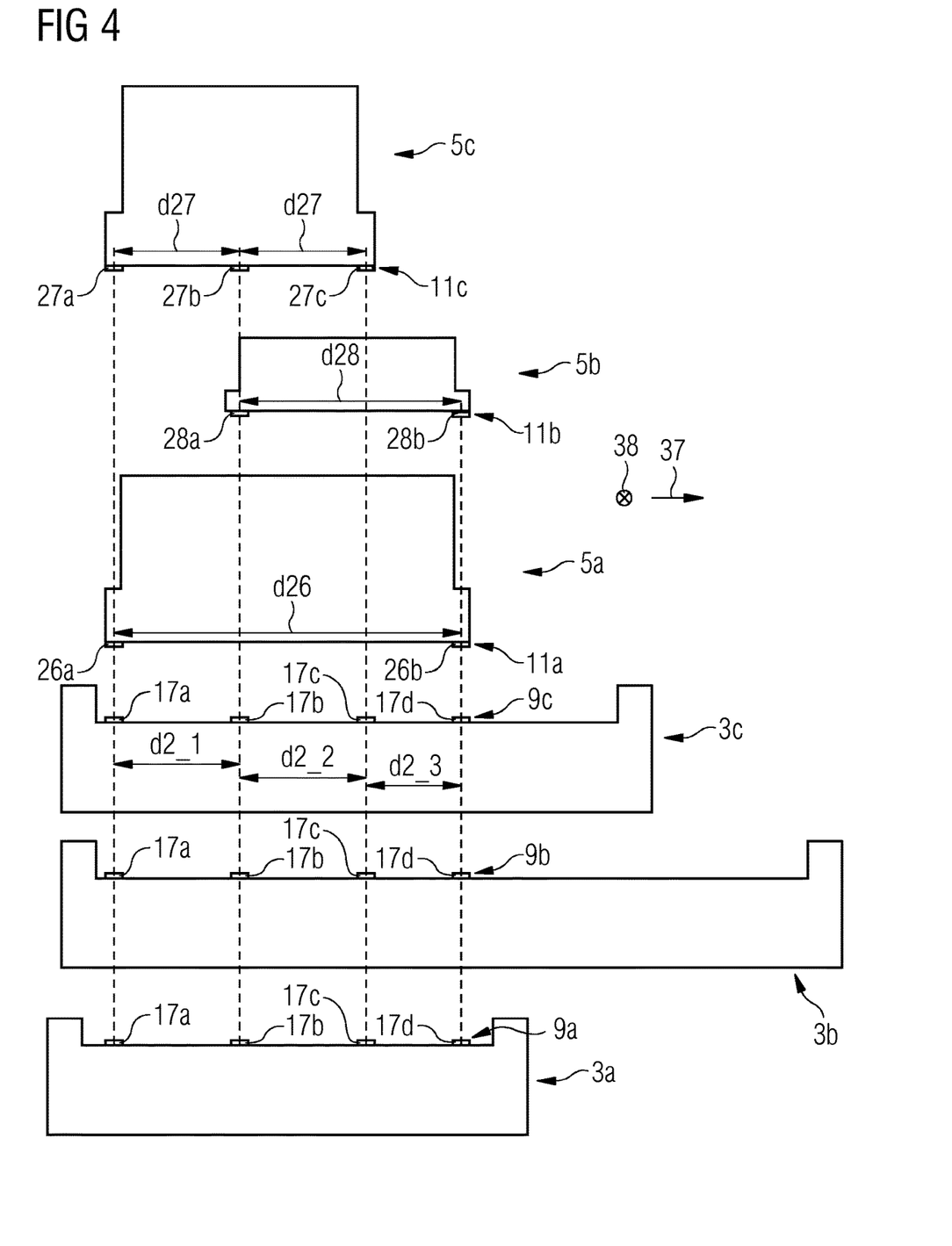
FIG. 4 schematically illustrates in a side view in a schematic manner different second portions and different first portions which may be comprised in an arrangement for transporting a wind turbine component according to an embodiment of the present invention.

FIG. 4 schematically illustrates in a side view several variants of a first portion, namely variants, but not limited to, 3a, 3b, 3c, at which different variants, but not limited to, 5a, 5b, 5c of a second portion may be placed and coupled thereto. Thereby, each the variants 3a, 3b, 3c of the first portion comprises a respective connection interface 9a, 9b, 9c and also the variants 5a, 5b, 5c of the second portion comprise respective connection interfaces IIa, 11b, 11c.

All variants 3a, 3b, 3c of the first portion comprise the connection plates 17a, 17b, 17c, 17d arranged in a same pattern. The variants 3a, 3b, 3c of the first portion vary by their size.

The variant 5a of the second portion comprises connection plates 26a, 26b which are spaced apart by a distance d26 which equals the distance between the connection plates 17a and 17d of all variants of the first portion. Thus, the variant 5a of the second portion may be coupled to any of the first portions 3a, 3b, 3c using the connection plates 26a, 26b screwed to the connection plates 17a, 17d.

The variant 5b of the second portion comprises connection plates 28a, 28b, which are spaced apart (in the longitudinal direction 37) by the distance d28 which equal the distance between the connection plates 17b, 17d of all variants 3a, 3b, 3c of the first portion. Thus, the variant 5b of the second portion may be coupled to any of the first portions 3a, 3b, 3c by screwing the connection plates 28a, 28b to respective connection plates 17b, 17d of the first portion.

The variant 5c of the second portion comprises the connection plates 27a, 27b, 27c which are also comprised in the second portion 5 illustrated in FIG. 3. The distances d27 between adjacent connection plates match the distance between the connection plate 17a and 17b and also match the distance between the connection plate 17b and 17c of all variants 3a, 3b, 3c of the first portion. As can be appreciated from FIG. 4, all variants 5a, 5b, 5c of the second portion can be coupled to each of the variants 3a, 3b, 3c of the first portion.

Figure 5:
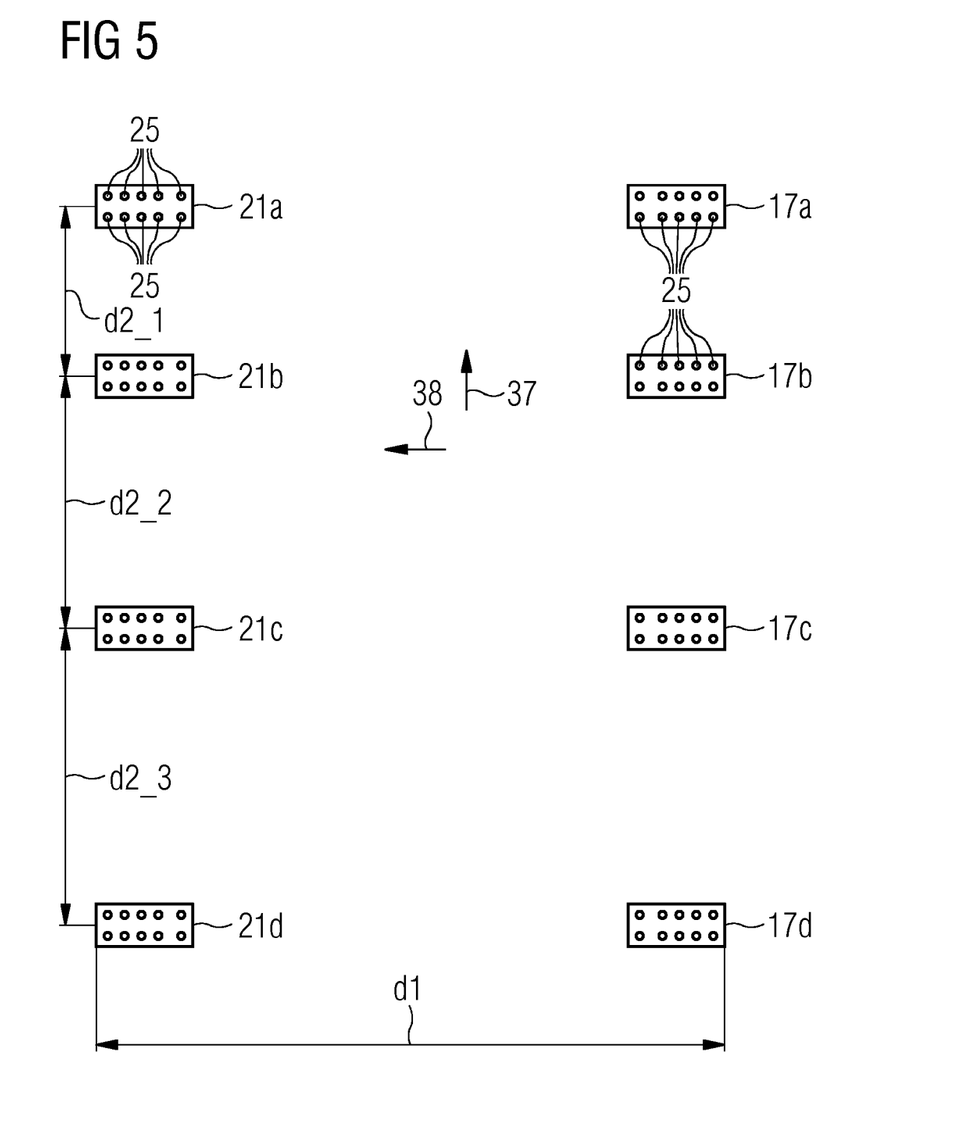
FIG. 5 schematically illustrates a pattern of connection plates as employed in an arrangement for transporting a wind turbine component according to an embodiment of the present invention in a top view.

FIG. 5 schematically illustrates the arrangement of connection plates 17a, . . . , 17d, 21a, . . . , 21d of the first portion 3 as illustrated in FIG. 2 in a top view. Each of the connection plates comprises in the illustrated embodiment ten holes into which or through which bolts or threaded rods may be inserted or screwed.

Figure 6:
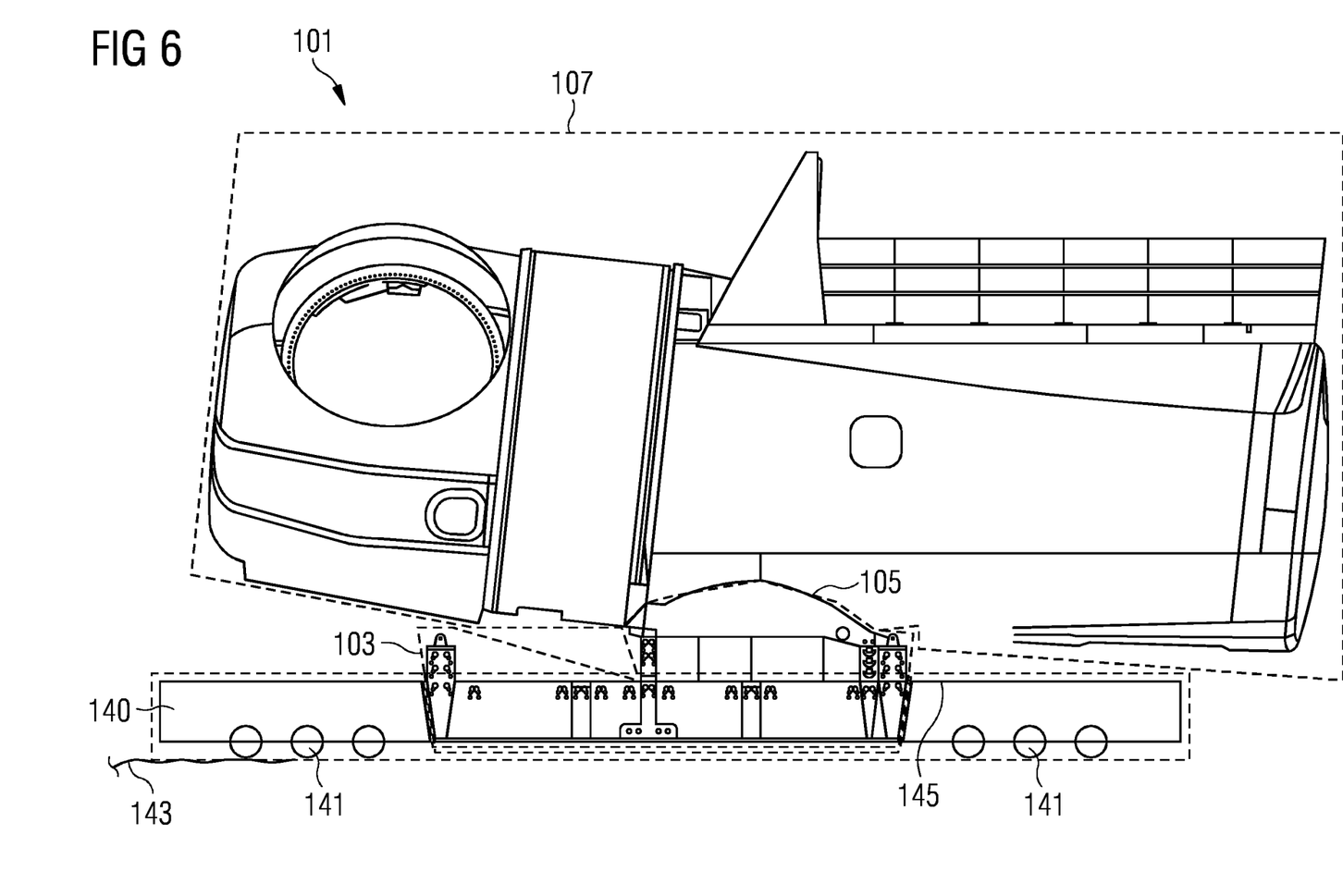
FIG. 6 schematically illustrates in a schematic side view an arrangement for transporting a wind turbine component according to an embodiment of the present invention.

FIG. 6 illustrates in a schematic side view another arrangement 101 for transporting a wind turbine component 107, in the illustrated embodiment a nacelle. At the second portion 105, the nacelle 107 is supported or mounted. The second portion 105 is coupled to the first portion 103 via a connection interface similar as illustrated in FIGS. 1 to 5. The first portion 103 is configured as a tunnel frame which is loaded onto a self-propelled modular transport (or trailer) 140 having plural wheels 141 and a loading area 145 at which the first portion 105 is placed.

With reference to FIG. 4, a two-part transport system is provided. The second portions 5a, 5b, 5c may be turbine-specific or wind turbine component-specific and the first portions 3a, 3b, 3c may be trailer-specific. Variations in the two portions may be introduced as different demands (turbine/trailer configuration) arise, moreover in specific cases for larger/heavier components the configuration can look like 2× first portions are arranged side by side (an then supported by 2 SPMTs) and second portion is designed so it ranges over 2 first portion creating one transport setup. Additionally, first portion can be designed wider so it can be used with 1.5 or 2 or more SPMT's assembled. All parts may be based on the same interface layout which is illustrated in, but not limited to, a schematic view in FIG. 5. The design of the interface ensures that any variation of the upper part can fit to any variation of the lower part (in FIG. 4). In order to do this, a standardized bolted interface between the two parts is proposed. The interface will ensure reusability of individual components without retrofit.

As can be seen in FIG. 6, the nacelle is attached to an adapter (second portion 105), where the nacelle 107 with the adapter 105 is placed on and mounted to a tunnel frame (first portion 103) via the connection interface. All items are moved between the location on a self-propelled modular transport (SPMT) 140, or a setup with a compromising passive trailer and pulling tractor. The same setup: first portion(s) with second portion but with/without trailer can be used to support the component on storage location, sea transportation on the vessel's deck and assembly and/or testing and/or weighing of the component in assembly/testing facilities. The tunnel frame comprises the different interfaces, a standardized bolted interface or other kind of standardized connection/attachment interface that fits to different adapters depending on for example different kinds of nacelles, hubs or other large wind turbine components using adapters for transportation and/or local storage. Instead of an SPMT, a trailer for a truck or other transportation means or transporter could be used for transportation in relation to embodiments of the invention. The tunnel frame may also vary in size depending on the size and weight of the wind turbine components to be transported.

The two-part system with bolted interface will lead to higher reusability and extended life of the transport equipment. Bolted interface between parts will characterize the transition to other trailer or turbine components as an assembly task rather than a retrofit task, thereby significantly reducing the costly retrofits seen in the conventional methods. For example, the first portion can be reused 1:1 with a new second portion, if for example a new trailer setup is to be used and the weight of the component is within the weight limits for the tunnel. For example, a second portion can be reused 1:1 with a new first portion when a new turbine is released. Thereby, a transport system with increased flexibility towards coming turbines is provided. All items of the transport system may be based on the same layout of the interfaces. Thereby, retrofit costs are reduced.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An arrangement for transporting a wind turbine component of a wind turbine, the arrangement comprising:
at least one first portion configured to be placed on a loading area, wherein the first portion comprises two parallel longitudinal beams extending in a longitudinal direction and two cross beams connecting the two parallel longitudinal beams in a width direction, wherein the two cross beams are located above and/or on top of the two parallel longitudinal beams, and wherein a lower surface of the two cross beams forms a contact surface for the loading area,
a second portion, having a component support portion configured to support the wind turbine component, wherein the second portion is not part of the wind turbine,
the first portion and the second portion each having a respective connection interface via which the first portion and the second portion are configured to reversibly couple to each other,
wherein the connection interface of the first portion comprises multiple connection plates having at least one hole for at least one bolt configured for reversibly coupling the connection interface of the first portion to the connection interface of the second portion,
wherein the multiple connection plates of the first portion are arranged on an upper surface of the two parallel longitudinal beams and between the cross beams connecting the two parallel longitudinal beams,
wherein the multiple connection plates of the first portion comprise a first pair of connection plates spaced apart in the width direction, a second pair of connection plates spaced apart in the width direction, and a third pair of connection plates spaced apart in the width direction,
wherein the first pair of connection plates of the multiple connection plates of the first portion are spaced apart from the second pair of connection plates of the multiple connection plates of the first portion in the longitudinal direction by a first longitudinal distance, and the second pair of connection plates of the multiple connection plates of the first portion are spaced apart from the third pair of connection plates of the multiple connection plates in the longitudinal direction by a second longitudinal distance different than the first longitudinal distance, and wherein the second portion is configured to extend between the first pair of connection plates, between the second pair of connection plates, and/or between the third pair of connection plates when reversibly coupled to the first portion.

2. The arrangement according to claim 1, further comprising:

a connector configured to mount the connection interface of the first portion to the connection interface of the second portion.

3. The arrangement according to claim 1, wherein the multiple connection plates of the connection interface of the first portion comprise at least four, substantially flat, connection plates.

4. The arrangement according to claim 1, wherein contact surfaces of all of the connection plates of the multiple connection plates of the first portion are arranged in a first plane, wherein contact surfaces of all connection plates of the second portion are arranged in a second plane.

5. The arrangement according to claim 1, wherein a respective at least one hole of a respective connection plate of the multiple connection plates of the first portion comprises an internal screw thread or through hole, wherein at least one hole of a connection plate of the second portion is a through hole.

6. The arrangement according to claim 1, wherein the connection interface of the second portion comprises multiple connection plates, wherein the connection plates of the first and the second portion are fixed or welded at the first portion and the second portion, respectively, in a predetermined or a rectangular, pattern, having predetermined distances from each other in two different lateral directions.

7. The arrangement according to claim 1, wherein a pattern of at least a part of the connection plates of the first portion matches a pattern of at least some connection plates of the second portion such that the part of the connection plates of the first portion superimposes on the at least some connection plates of the second portion.

8. The arrangement according to claim 1, wherein the multiple connection plates comprise at least two columns of respective connection plates fixed at the first portion, the two columns being spaced apart in the width direction.

9. The arrangement according to claim 8, wherein each column of the at least two columns has several rows of respective connection plates being spaced apart in the longitudinal direction by the first longitudinal distance or the second longitudinal distance, respectively.

10. The arrangement according to claim 1, wherein the first portion is configured as a tunnel frame forming a tunnel when placed at a ground surface, wherein a trailer can be moved into the tunnel and can lift the first portion from the ground for transporting the wind turbine component.

11. The arrangement according to claim 1, further comprising:

a further second portion configured to support another wind turbine component; the further second portion comprising a further connection interface via which the first portion and the further second portion are reversibly couplable to each other, and/or the arrangement further comprising:

a self-propelled modular transport and/or a trailer and/or a truck on which the first portion is placeable.

12. A method of preparing and transporting a wind turbine component of a wind turbine, the method comprising:

providing at least one first portion, wherein the first portion comprises two parallel longitudinal beams extending in a longitudinal direction and two cross beams connecting the two parallel longitudinal beams in a width direction, wherein the two cross beams are located above and/or on top of the two parallel longitudinal beams, and wherein a lower surface of the two cross beams forms a contact surface for a loading area;

providing a second portion, having a component support portion, wherein the second portion is not part of the wind turbine;

supporting the wind turbine component by the second portion;

coupling the second portion to the first portion via respective connection interfaces of the first portion and the second portion; and placing the first portion on the loading area such that the first portion is lifted by the contact surface for the loading area, wherein the respective connection interfaces of the first portion and the second portion each comprise multiple connection plates having at least one hole for at least one bolt configured to couple the second portion to the first portion, wherein the multiple connection plates of the first portion are arranged on an upper surface of the two parallel longitudinal beams and between the cross beams connecting the two parallel longitudinal beams, wherein the multiple connection plates of the first portion comprise a first set of connection plates spaced apart in the width direction, a second set of connection plates spaced apart in the width direction, and a third set of connection plates spaced apart in the width direction, wherein the multiple connection plates of the second portion are also spaced apart in the width direction such that the second portion extends between the first set of connection plates, between the second set of connection plates, and/or between the third set of connection plates, and wherein the first set of adjacent connection plates of the multiple connection plates of the first portion are spaced apart from the second set of connection plates of the multiple connection plates of the first portion in the longitudinal direction by a first longitudinal distance and the second set of adjacent connection plates of the multiple connection plates of the first portion are spaced apart from the third set of connection plates of the multiple connection plates of the first portion in the longitudinal direction by a second longitudinal distance different than the first longitudinal distance.

13. A kit for transporting wind turbine components, comprising:

at least one first portion configured to be placed on a loading area, wherein the first portion comprises two parallel longitudinal beams extending in a longitudinal direction and two cross beams connecting the two parallel longitudinal beams in a width direction, wherein the two cross beams are located above and/or on top of the two parallel longitudinal beams, wherein a lower surface of the two cross beams forms a contact surface for the loading area, the at least one first portion including a first connection interface;

a second portion, having a component support portion configured to support a wind turbine component and a second connection interface configured to reversibly couple to the first connection interface, wherein the second portion is not part of the wind turbine; and a further second portion, having a further component support portion configured to support a further wind turbine component and a further second connection interface configured to reversibly couple to the first connection interface, wherein the further second portion is also not part of the wind turbine, wherein the first connection interface comprises multiple connection plates having at least one hole for at least one bolt configured for reversibly coupling the first connection interface to the second connection interface and/or to the further second connection interface, wherein the multiple connection plates of the first portion are arranged on the two parallel longitudinal beams and comprise a first pair of connection plates spaced apart in the width direction, a second pair of connection plates spaced apart in the width direction, and a third pair of connection plates spaced apart in the width direction, wherein the first pair of connection plates of the multiple connection plates of the first portion are spaced apart from the second pair of connection plates of the multiple connection plates of the first portion in the longitudinal direction by a first longitudinal distance and the second pair of connection plates of the multiple connection plates of the first portion are spaced apart from the third pair of connection plates of the multiple connection plates of the first portion in the longitudinal direction by a second longitudinal distance different than the first longitudinal distance, and wherein the second portion and the further second portion are each configured to separately extend between the first pair of connection plates, between the second pair of connection plates, and/or between the third pair of connection plates when reversibly coupled to the first portion.

14. The kit according to claim 13, wherein the second connection interface and the further second connection interface comprise multiple connection plates, wherein the multiple connection plates of the second portion comprise a fourth pair of connection plates and a fifth pair of connection plates, and wherein the multiple connection plates of the further second portion comprise a sixth pair of connection plates and a seventh pair of connection plates, wherein the fourth pair of connection plates of the multiple connection plates of the second portion are spaced apart from the fifth pair of connection plates of the multiple connection plates of the second portion in the longitudinal direction by a third distance and wherein the sixth pair of connection plates of the multiple connection plates of the further second portion are spaced apart from the seventh pair of connection plates of the further second portion in the longitudinal direction by a fourth distance.

15. The kit according to claim 13, wherein respective connection plates of the second portion align with respective connection plates of the multiple connection plates of the first portion when the first portion and the second portion are reversibly coupled to each other and respective connection plates of the multiple connection plates of the further second portion align with respective connection plates of the multiple connection plates of the first portion when the first portion and the further second portion are reversibly coupled to each other.

16. The arrangement according to claim 6, wherein respective connection plates of the second portion align with respective connection plates of the multiple connection plates of the first portion when the first portion and the second portion are reversibly coupled to each other.

17. The arrangement according to claim 1, wherein the loading area contact surface is configured to form a top of a tunnel frame.

18. The arrangement according to claim 1, wherein the upper surface of the two parallel longitudinal beams is horizontal.

19. The arrangement according to claim 1, wherein the upper surface of the two parallel longitudinal beams is a top surface of the two parallel longitudinal beams.

\* \* \* \* \*